(12) United States Patent
Wu et al.

(10) Patent No.: US 12,348,293 B2
(45) Date of Patent: Jul. 1, 2025

(54) JOINT PORT SELECTION FOR MULTIPLE TRANSMISSION AND RECEPTION POINTS

(71) Applicant: QUALCOMM Incorporated, San Diego, CA (US)

(72) Inventors: Liangming Wu, Beijing (CN); Chenxi Hao, Beijing (CN); Yu Zhang, San Diego, CA (US); Chao Wei, Beijing (CN); Qiaoyu Li, Beijing (CN); Min Huang, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/759,605

(22) PCT Filed: Feb. 14, 2020

(86) PCT No.: PCT/CN2020/075361
§ 371 (c)(1),
(2) Date: Jul. 27, 2022

(87) PCT Pub. No.: WO2021/159504
PCT Pub. Date: Aug. 19, 2021

(65) Prior Publication Data
US 2023/0093589 A1    Mar. 23, 2023

(51) Int. Cl.
*H04B 7/06*    (2006.01)
*H04B 7/0456*    (2017.01)

(52) U.S. Cl.
CPC ......... *H04B 7/0639* (2013.01); *H04B 7/0456* (2013.01); *H04B 7/0626* (2013.01); *H04B 7/063* (2013.01)

(58) Field of Classification Search
CPC .. H04B 7/0613; H04B 7/0615; H04B 7/0619; H04B 7/0636; H04B 7/0639;
(Continued)

(56) References Cited

U.S. PATENT DOCUMENTS 8,948,196 B2 * 2/2015 Gaal ................... H04B 7/0413
370/443
10,320,546 B2 * 6/2019 Kim ......................... H04L 5/00
(Continued)

FOREIGN PATENT DOCUMENTS

CN          110636617 A      12/2019
WO    WO-2018229078 A1    12/2018

OTHER PUBLICATIONS

Lenovo et al: "Discussion of multi-TRP/Panel Transmission", 3GPP TSG RAN WG1 Meeting #98, R1-1908720, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, 19 Pages.
(Continued)

*Primary Examiner* — James M Perez
(74) *Attorney, Agent, or Firm* — NORTON ROSE FULBRIGHT US LLP

(57) ABSTRACT

A method includes receiving, by a user equipment (UE) device, a joint transmission of channel state information (CSI) reference signals (CSI-RS) from a first transmission and reception point (TRP) associated with a wireless network and at least a second TRP associated with the wireless network. The method further includes determining a joint rank parameter associated with the joint transmission and accessing, based on the joint rank parameter, a rank-to-port mapping codebook to determine a port index parameter. The method further includes, after determining the port index parameter, communicating, by the UE device, with one or more of the first TRP or the second TRP. Other aspects and features are also claimed and described.

30 Claims, 10 Drawing Sheets

(58) Field of Classification Search
CPC .... H04B 7/0456; H04B 7/046; H04B 7/0473; H04B 7/0626; H04B 7/063
See application file for complete search history.

(56) References Cited

U.S. PATENT DOCUMENTS

| | | | | |
|---|---|---|---|---|
| 10,848,223 B2* | 11/2020 | Kim | ...................... | H04B 17/309 |
| 10,924,163 B2* | 2/2021 | Dayvdov | ............. | H04B 7/0658 |
| 11,245,444 B2* | 2/2022 | Faxér | ................. | H04B 7/0417 |
| 11,381,289 B2* | 7/2022 | Wu | ....................... | H04B 7/0639 |
| 11,641,261 B1* | 5/2023 | Khoshnevisan | ........ | H04L 1/189 370/329 |
| 11,716,184 B2* | 8/2023 | Zhang | .................. | H04B 7/0626 370/329 |
| 11,757,495 B2* | 9/2023 | Faxér | ................... | H04B 7/0802 370/329 |
| 11,882,612 B2* | 1/2024 | Huang | .................. | H04L 5/0007 |
| 12,107,647 B2* | 10/2024 | Hao | ....................... | H04W 24/10 |
| 12,212,390 B2* | 1/2025 | Venugopal | ........... | H04B 7/0632 |
| 2011/0103324 A1* | 5/2011 | Nam | ...................... | H04L 5/0048 370/329 |
| 2012/0106373 A1* | 5/2012 | Gaal | ................. | H04L 25/03343 370/252 |
| 2014/0050276 A1* | 2/2014 | Zhang | .................. | H04B 7/0619 375/267 |
| 2014/0192917 A1* | 7/2014 | Nam | ..................... | H04B 7/0632 375/267 |
| 2014/0200001 A1* | 7/2014 | Song | ....................... | H04W 8/02 455/436 |
| 2015/0195071 A1* | 7/2015 | Lunttila | ............ | H04L 25/03904 370/329 |
| 2015/0304997 A1* | 10/2015 | Park | ........................ | H04J 11/00 370/330 |
| 2015/0312074 A1* | 10/2015 | Zhu | ....................... | H04L 5/0046 370/329 |
| 2016/0006553 A1* | 1/2016 | Kim | ...................... | H04L 1/1864 370/252 |
| 2017/0078065 A1* | 3/2017 | Nam | .................... | H04B 7/0413 |
| 2017/0195100 A1* | 7/2017 | Kim | ..................... | H04B 7/0456 |
| 2017/0244519 A1* | 8/2017 | Yang | ..................... | H04L 1/0026 |
| 2018/0034612 A1* | 2/2018 | Lin | ..................... | H04L 25/0224 |
| 2018/0042028 A1* | 2/2018 | Nam | ..................... | H04L 5/0035 |
| 2018/0091272 A1* | 3/2018 | Wang | ................... | H04L 5/0048 |
| 2018/0102817 A1* | 4/2018 | Park | ..................... | H04B 7/0417 |
| 2018/0115357 A1* | 4/2018 | Park | ...................... | H04W 72/00 |
| 2018/0145735 A1* | 5/2018 | Chen | .................... | H04B 7/0486 |
| 2018/0212664 A1* | 7/2018 | Kim | .................... | H04B 7/0639 |
| 2018/0262250 A1* | 9/2018 | Kim | .................... | H04B 17/309 |
| 2018/0270799 A1* | 9/2018 | Noh | ..................... | H04L 27/261 |
| 2019/0149211 A1* | 5/2019 | Nilsson | ................ | H04B 7/0408 375/267 |
| 2019/0158161 A1* | 5/2019 | Faxér | .................... | H04B 7/0469 |
| 2020/0044712 A1* | 2/2020 | Manolakos | ............. | H04L 5/005 |
| 2020/0186207 A1* | 6/2020 | Davydov | ............. | H04B 7/0469 |
| 2020/0274598 A1* | 8/2020 | Hao | .................... | H04B 7/0486 |
| 2020/0296742 A1* | 9/2020 | Hao | .................... | H04B 7/0626 |
| 2021/0143870 A1* | 5/2021 | Faxér | .................... | H04L 5/0057 |
| 2021/0159953 A1* | 5/2021 | Wu | ..................... | H04B 7/0478 |
| 2022/0166469 A1* | 5/2022 | Faxer | ...................... | H04L 5/005 |
| 2023/0027718 A1* | 1/2023 | Venugopal | ............ | H04L 5/0051 |
| 2023/0093589 A1* | 3/2023 | Wu | ....................... | H04B 7/0639 375/267 |
| 2023/0354267 A1* | 11/2023 | Huang | .................. | H04W 72/02 |
| 2024/0030978 A1* | 1/2024 | Ly | ........................ | H04B 7/0486 |

OTHER PUBLICATIONS

Supplementary European Search Report—EP20918701—Search Authority—Munich—Oct. 12, 2023.
AT&T: "Remaining Issues of PAPR in NR," 3GPP TSG RAN WG1 Meeting #95, R1-1812851, Nov. 12-16, 2018 (Nov. 16, 2018).
International Search Report and Written Opinion—PCT/CN2020/075361—ISA/EPO—Nov. 18, 2020.

* cited by examiner

JOINT PORT SELECTION FOR MULTIPLE TRANSMISSION AND RECEPTION POINTS

CROSS-REFERENCE TO RELATED APPLICATIONS

This application claims the benefit of the International Application No. PCT/CN2020/075361, entitled "JOINT PORT SELECTION FOR MULTIPLE TRANSMISSION AND RECEPTION POINTS" and filed on Feb. 14, 2020, which is expressly incorporated by reference herein it its entirety.

TECHNICAL FIELD

Aspects of the present disclosure relate generally to wireless communication systems, and more particularly, to port selection in wireless communication systems. Certain aspects of the technology discussed below can enable and provide joint selection of ports of multiple transmission and reception points (TRPs) of a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method includes receiving, by a user equipment (UE) device, a joint transmission of channel state information (CSI) reference signals (CSI-RS) from a first transmission and reception point (TRP) associated with a wireless network and at least a second TRP associated with the wireless network. The method further includes determining a joint rank parameter associated with the joint transmission and accessing, based on the joint rank parameter, a rank-to-port mapping codebook to determine a port index parameter. The method further includes, after determining the port index parameter, communicating, by the UE device, with one or more of the first TRP or the second TRP.

In an additional aspect of the disclosure, a method includes sending, by a first transmission and reception point (TRP) associated with a wireless network, a first channel state information (CSI) report configuration message that includes a rank-to-port mapping codebook. The method further includes sending, by the first TRP, a CSI reference signal (CSI-RS). The method further includes, in response to sending the CSI-RS and the CSI report configuration message, receiving a CSI report message from a user equipment (UE) device. The method further includes determining, based on the CSI report message, a joint selection of ports of the first TRP and a second TRP associated with the wireless network.

In an additional aspect of the disclosure, a non-transitory computer-readable medium has program code recorded thereon. The program code includes program code executable by a computer for causing the computer to receive, at a user equipment (UE) device, a joint transmission of channel state information (CSI) reference signals (CSI-RS) from a first transmission and reception point (TRP) associated with a wireless network and at least a second TRP associated with the wireless network. The program code further includes program code executable by the computer for causing the computer to determine a joint rank parameter associated with the joint transmission. The program code further includes program code executable by the computer for causing the computer to access, based on the joint rank parameter, a rank-to-port mapping codebook to determine a port index parameter. The program code further includes program code executable by the computer for causing the computer to communicate, after determining the port index parameter, with one or more of the first TRP or the second TRP.

In an additional aspect of the disclosure, a non-transitory computer-readable medium has program code recorded thereon. The program code includes program code executable by a computer for causing the computer to send, by a first transmission and reception point (TRP) associated with a wireless network, a first channel state information (CSI) report configuration message that includes a rank-to-port mapping codebook. The program code further includes program code executable by the computer for causing the computer to send, by the first TRP, a CSI reference signal (CSI-RS). The program code further includes program code executable by the computer for causing the computer to receive, in response to sending the CSI-RS and the CSI report configuration message, a CSI report message from a user equipment (UE) device. The program code further includes program code executable by the computer for causing the computer to determine, based on the CSI report message, a joint selection of ports of the first TRP and a second TRP associated with the wireless network.

In an additional aspect of the disclosure, an apparatus configured for wireless communication is disclosed. The apparatus includes at least one processor, and a memory coupled to the processor. The processor is configured to receive, by a user equipment (UE) device, a joint transmission of channel state information (CSI) reference signals (CSI-RS) from a first transmission and reception point (TRP) associated with a wireless network and at least a second TRP associated with the wireless network. The processor is further configured to determine a joint rank parameter associated with the joint transmission and to access, based on the joint rank parameter, a rank-to-port mapping codebook to determine a port index parameter. The processor is further configured to communicate, after determining the port index parameter, with one or more of the first TRP or the second TRP.

In an additional aspect of the disclosure, an apparatus configured for wireless communication is disclosed. The apparatus includes at least one processor, and a memory coupled to the processor. The processor is configured to send, by a first transmission and reception point (TRP) associated with a wireless network, a first channel state information (CSI) report configuration message that includes a rank-to-port mapping codebook. The processor is further configured to send, by the first TRP, a CSI reference signal (CSI-RS). The processor is further configured to receive, in response to sending the CSI-RS and the CSI report configuration message, a CSI report message from a user equipment (UE) device. The processor is further configured to determine, based on the CSI report message, a joint selection of ports of the first TRP and a second TRP associated with the wireless network.

In an additional aspect of the disclosure, an apparatus configured for wireless communication is disclosed. The apparatus includes means for receiving, by a user equipment (UE) device, a joint transmission of channel state information (CSI) reference signals (CSI-RS) from a first transmission and reception point (TRP) associated with a wireless network and at least a second TRP associated with the wireless network. The apparatus further includes means for determining a joint rank parameter associated with the joint transmission and for accessing, based on the joint rank parameter, a rank-to-port mapping codebook to determine a port index parameter. The apparatus further includes means for communicating, after determining the port index parameter, with one or more of the first TRP or the second TRP.

In an additional aspect of the disclosure, an apparatus configured for wireless communication is disclosed. The apparatus includes means for sending, by a first transmission and reception point (TRP) associated with a wireless network, a first channel state information (CSI) report configuration message that includes a rank-to-port mapping codebook and for sending, by the first TRP, a CSI reference signal (CSI-RS). The apparatus further includes means for receiving, in response to sending the CSI-RS and the CSI report configuration message, a CSI report message from a user equipment (UE) device. The apparatus further includes means for determining, based on the CSI report message, a joint selection of ports of the first TRP and a second TRP associated with the wireless network.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
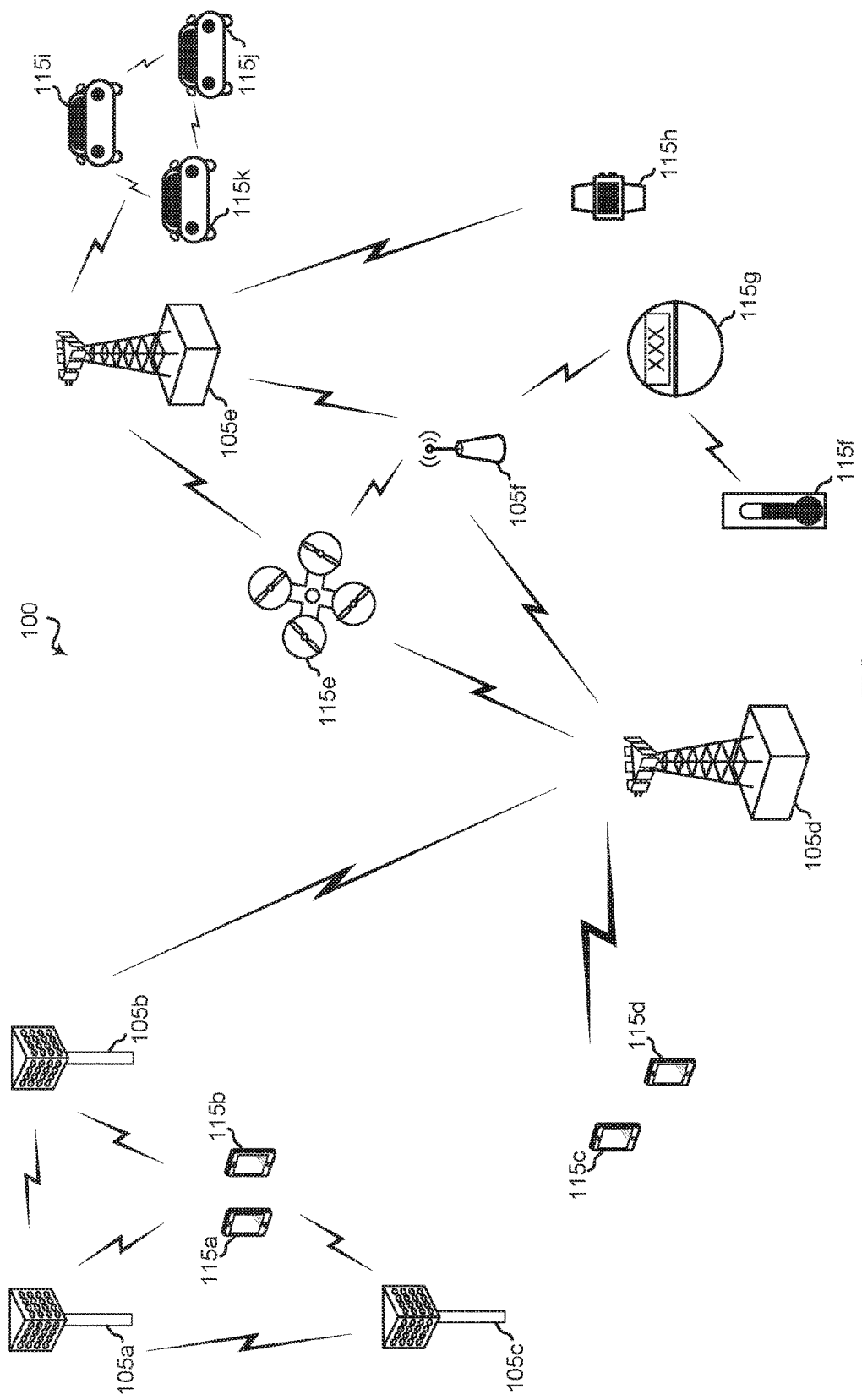
FIG. 1 is a block diagram illustrating details of a wireless communication system configured to perform joint port selection with multiple transmission and reception points (TRPs) according to some aspects of the present disclosure.

The Appendix provides further details regarding various aspects of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In some wireless communication systems, multiple transmission and reception points (TRPs) are used. For example, a particular base station or cell may include multiple TRPs that transmit signals to and receive signals from one or more user equipment (UE) devices. The TRPs may be geographically distributed throughout a cell area to increase coverage associated with the base station. Use of multiple TRPs may improve system performance by increasing reliability and coverage for UE devices.

Use of multiple TRPs may result in increased power consumption in some wireless communication systems. For example, as the number of TRPs increases in a cell, an amount of power used to generate and amplify transmitted signals may also increase. Further, in some cases, use of multiple TRPs may involve increase an amount of processing of received signals, which may also increase power consumption. In addition, use of multiple TRPs may increase a number of signals present in a wireless communication system, which can lead to increased noise or interference in some cases. In certain networks, such as some 5th Generation (5G) or new radio (NR) networks, a number of TRPs in a cell may be relatively large, which can involve a large amount of signal amplification, transmission, processing, and other operations.

In accordance with one aspect of the disclosure, certain port selection operations are performed on a joint basis for multiple TRPs. Performing the port selection operations on a joint basis may reduce a number of signals transmitted within a wireless communication network as compared to certain conventional techniques, such as techniques in which port selection operations are performed separately for each of multiple TRPs.

To illustrate, a rank-to-port mapping codebook may be used by a UE device and by a base station that uses multiple TRPs to communicate with the UE device. The UE device may determine a rank parameter (RI) associated with communications with the base station (e.g., by determining a number of spatial streams received from the multiple TRPs). The UE device may provide the RI to the base station, such as by sending a channel state information (CSI) report message to the base station to indicate the RI.

In some examples, the RI is used to perform a lookup operation to the rank-to-port mapping codebook for selection of ports of the multiple TRPs. For example, the rank-to-port mapping codebook may indicate, for multiple values of the RI, a corresponding selection of ports of the multiple TRPs. After port selection, the one or more ports can be used for communications between the UE device and the base station, such as by using the ports to send a non-coherent joint transmission (NCJT) of CSI reference signals (CSI-RS).

Joint port selection as described herein may increase communication efficiency in a communication system. For example, by selecting ports of multiple TRPs using a single RI, a number of messages sent within the wireless communication network is reduced as compared to other techniques that separately select ports of multiple TRPs using multiple messages. As a result, power consumption, noise, and interference can be reduced.

To further illustrate, this disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for joint port selection among multiple TRPs according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
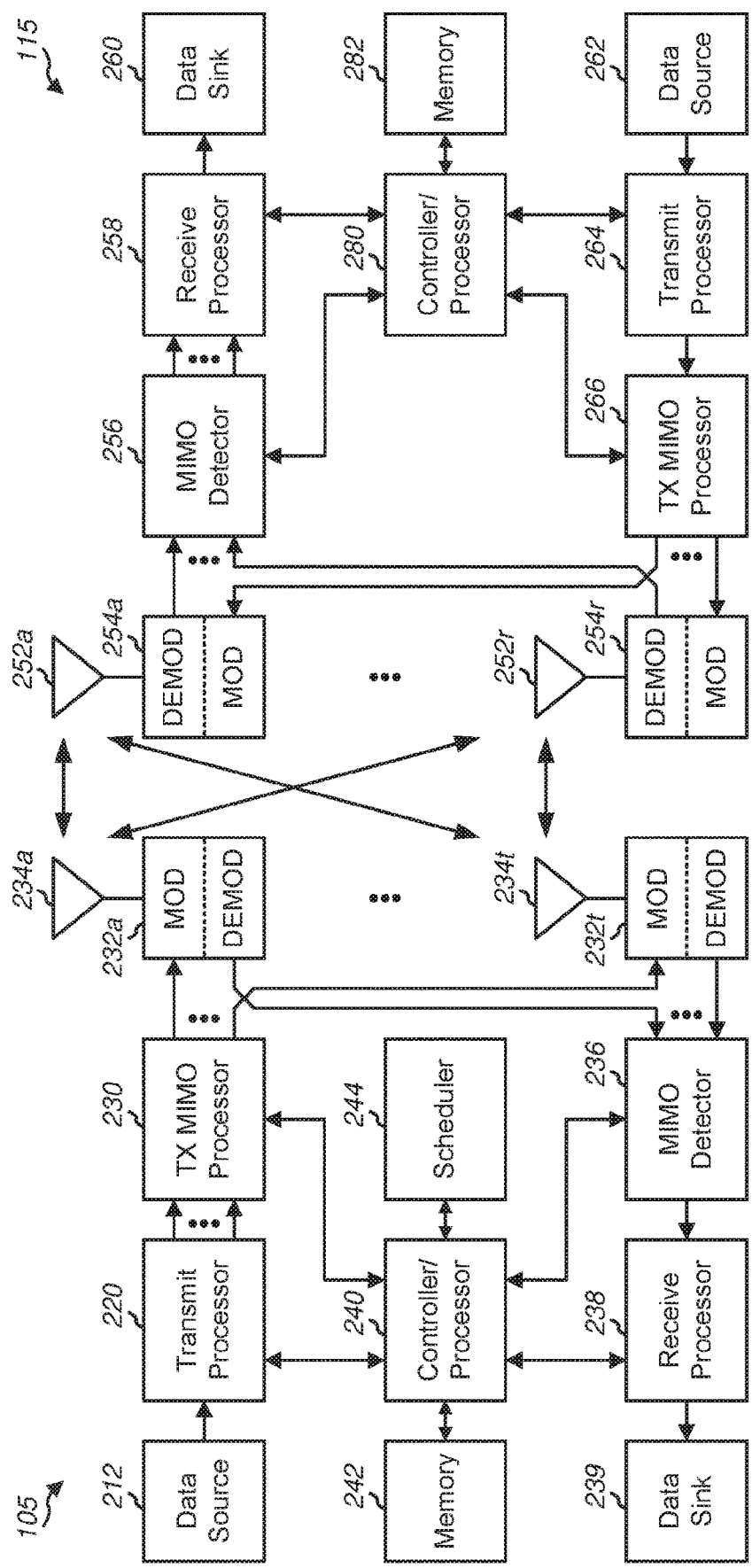
FIG. 2 is a block diagram conceptually illustrating a design of a base station and a UE configured to perform joint port selection with multiple TRPs according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 232a through 232t (e.g., for SC-FDM, etc.), and transmitted to the base station 105. At base station 105, the uplink signals from UE 115 may be received by antennas 234, processed by demodulators 254, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 9 and 10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
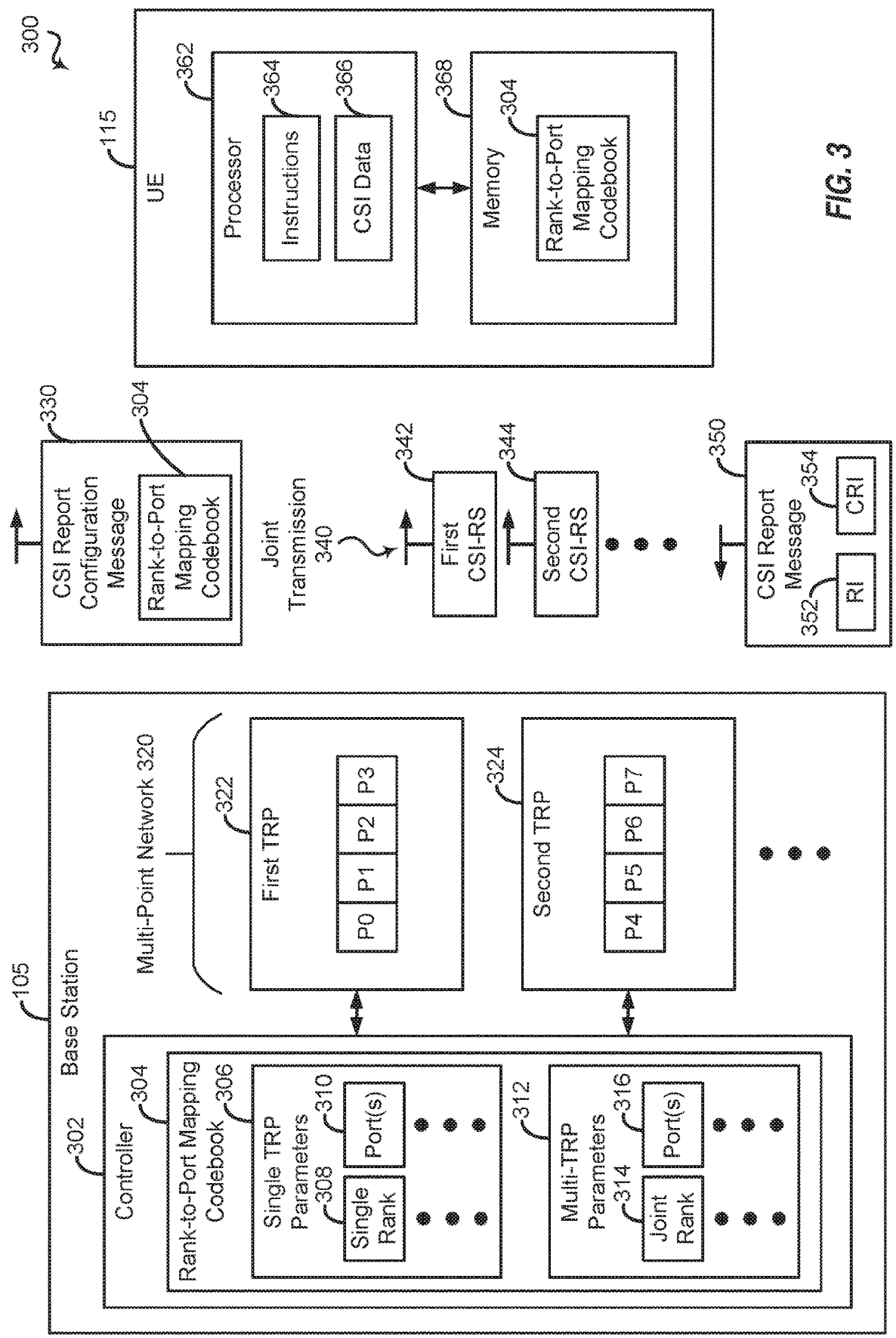
FIG. 3 is a block diagram illustrating an example of a wireless communication system configured to perform joint port selection with multiple TRPs according to some aspects of the present disclosure.

FIG. 3 is a block diagram of an example wireless communications system 300 that performs joint port selection for multiple transmission and reception points (TRPs). In some examples, the wireless communications system 300 may implement aspects of the wireless communication system 100 of FIG. 1. For example, the wireless communications system 300 may include the base station 105. As another example, the base station 105 may include the UE 115. Although one UE and one base station are illustrated in FIG. 3, in other implementations, the wireless communications system 300 may include multiple UEs 115, multiple base stations 105, or both.

FIG. 3 illustrates that the base station 105 includes a controller 302 (e.g., the controller/processor 240) and a multi-point network 320 including a first TRP 322 and at least a second TRP 324. The controller 302 is coupled to the first TRP 322 and to the second TRP 324. Although the example of FIG. 3 illustrates two TRPs 322, 324, in other implementations, the multi-point network 320 may include more than two TRPs.

FIG. 3 also illustrates that the UE 115 includes a processor 362 and a memory 368. The processor 362 is coupled to the memory 368. In some examples, the processor 362 corresponds to the controller/processor 280, and the memory 368 corresponds to the memory 282. The processor 362 may be configured to retrieve instructions 364 from the memory 368 and to execute the instructions 364 to perform, initiate, or control one or more operations described herein. Similarly, the controller 302 may include a memory storing instructions and a processor configured to execute the instructions to perform, initiate, or control one or more operations described herein.

During operation, the base station may use the multi-point network 320 to communicate with the UE 115. For example, each TRP 322, 324 may send one or more spatial streams (also referred to herein as layers) using one or more ports. As used herein, a port may refer an antenna port, which may be a virtualized antenna or a logical antenna (instead of a physical antenna). To illustrate, in the non-limiting example of FIG. 3, the first TRP 322 includes ports P0, P1, P2, and P3. The example of FIG. 3 also illustrates that the second TRP 324 includes ports P4, P5, P6, and P7. In other examples, a different number of ports may be implemented.

The UE 115 may be configured to determine a rank parameter associated with spatial streams received from the first TRP 322, from the second TRP 324, or both. To illustrate, the UE 115 may be configured to determine a first rank parameter indicating a first number of spatial streams received from the first TRP 322. As another example, the UE 115 may be configured to determine a second rank parameter indicating a second number of spatial streams received from the second TRP 324. As an additional example, the UE 115 may be configured to determine a joint rank parameter indicating a combined number of spatial streams received from the first TRP 322 and the second TRP 324.

The base station 105 is configured to receive or to determine a rank-to-port mapping codebook 304. The rank-to-port mapping codebook 304 may also be referred to as a port-to-rank mapping codebook. The rank-to-port mapping codebook 304 indicates mappings of ports of the TRPs 322, 324 to rank parameters. The rank-to-port mapping codebook 304 may include single TRP parameters 306 (e.g., for communications in which one of the first TRP 322 or the second TRP 324 is used to communicate with the UE 115). For example, the single TRP parameters 306 may include a representative rank parameter 308 and a representative port index parameter 310. The rank-to-port mapping codebook 304 includes multi-TRP parameters 312 (e.g., for communications in which both of the first TRP 322 and the second TRP 324 are used to communicate with the UE 115). For example, the multi-TRP parameters 312 may include a representative joint rank parameter 314 and a representative port index parameter 316.

The base station 105 may provide the rank-to-port mapping codebook 304 to the UE 115. In one example, the base station 105 sends to the UE 115 a channel state information (CSI) report configuration message 330 including the rank-to-port mapping codebook 304. In some examples, upon receiving the rank-to-port mapping codebook 304 from the base station 105, the UE 115 stores the rank-to-port mapping codebook 304 to the memory 368.

In some examples, the rank-to-port mapping codebook 304 is specific to the particular base station 105. For example, in some implementations, each base station 105 illustrated in FIG. 1 is associated with a respective rank-to-port mapping codebook 304 that is provided to UE devices, such as the UE 115. In another example, the rank-to-port mapping codebook 304 can be associated with multiple base stations 105.

The UE 115 is configured to communicate data with the base station 105 based on the CSI report configuration message 330 and the rank-to-port mapping codebook 304. To illustrate, the CSI report configuration message 330 may specify one or more operations to be performed by the UE 115 in connection with generating a CSI report message 350.

In one example, the UE 115 is configured to receive one or more CSI reference signals (CSI-RS) from the base station 105. For example, the first TRP 322 and the second TRP 324 may send a joint transmission 340 including a first CSI-RS 342 sent by the first TRP 322 and further including a second CSI-RS 344 sent by the second TRP 324. The joint transmission 340 may correspond to a non-coherent joint transmission (NCJT) (e.g., where the first CSI-RS 342 is or may be non-coherent with respect to the second CSI-RS 344).

The UE 115 may be configured to determine CSI data 366 based on the first CSI-RS 342 and the second CSI-RS 344. In one example, the UE 115 is configured to determine a joint rank parameter associated with the joint transmission 340, such as the joint rank parameter 314. The joint rank parameter 314 may indicate a first number of spatial streams received from the first TRP 322, a second number of spatial streams received from the second TRP 324, and a combined number of spatial streams received from the multi-point network 320 via the joint transmission 340.

The UE 115 may be configured to access, based on the joint rank parameter 314, the rank-to-port mapping codebook 304 to determine a port index parameter, such as the port index parameter 316. For example, the processor 362 may be configured to perform a lookup operation to the rank-to-port mapping codebook 304 based on the joint rank parameter 314 to identify the port index parameter 316.

The port index parameter 316 may indicate a configuration of ports of the multi-point network 320. For example, the port index parameter 316 may indicate one or more of the ports P0, P1, P2, and P3 of the first TRP 322 and may further indicate one or more of the ports P4, P5, P6, and P7 of the second TRP 324.

The UE 115 is configured to communicate with the base station 105 based on the joint rank parameter 314 and based on the port index parameter 316. For example, the UE 115 may send to the base station 105 the CSI report message 350 including a rank indicator (RI) 352 that corresponds to or that is based on the joint rank parameter 314. To illustrate, the joint rank parameter 314 may include an RI 352 for each TRP (e.g., one RI 352 for a single-TRP mode, or two RIs 352 for a two-TRP mode, etc.). In some examples, the CSI report message 350 includes a CSI-RS resource indicator (CRI) 354.

The RI 352 may indicate or may be used by the base station 105 to determine a selection of one or more of the ports P0-P7. For example, the UE 115 may provide the RI 352 to the TRPs 322, 324 using the CSI report message 350, and the base station 105 may perform a lookup operation based on the RI 352 (e.g., to identify ports indicated by the port index parameter 316). Providing the RI 352 and the CRI 354 to the base station 105 to indicate selection of ports of the TRPs 322, 324 may be referred to as a multi-TRP port selection operation.

In some examples, the base station 105 uses the selected ports to transmit one or more signals to the UE 115. For example, the base station 105 may tune a transmitter based on the selected ports to initiate a multi-TRP beamforming operation. The multi-TRP beamforming operation may include selectively activating TRPs (or antenna elements of one or more TRPs) to transmit one or more beams in a particular direction toward the UE 115. The one or more beams may include certain signals, such as the CSI-RS 342, 344, one or more other signals (e.g., a data signal), or a combination thereof. In some examples, a selected port is associated with a particular pre-coder, a particular beam pattern, or a combination thereof.

As another example, the UE 115 may use the port index parameter 316 to determine one or more parameters for communicating with the base station 105, such as by tuning a receiver to receive signals (e.g., the CSI-RS 342, 344 or other signals) from the TRPs 322, 324 based on the ports indicated by the port index parameter 316. As an example, a particular port may be associated with a beam having a particular directionality, and the UE 115 may selectively activate antenna elements of the UE 115 to receive the beam.

One or more aspects described with reference to FIG. 3 may increase communication efficiency in a communication system. For example, by selecting ports of multiple TRPs using a single RI, a number of messages sent within the wireless communication network is reduced as compared to other techniques that separately select ports of multiple TRPs using multiple messages. As a result, power consumption, noise, and interference can be reduced.

Figure 4:
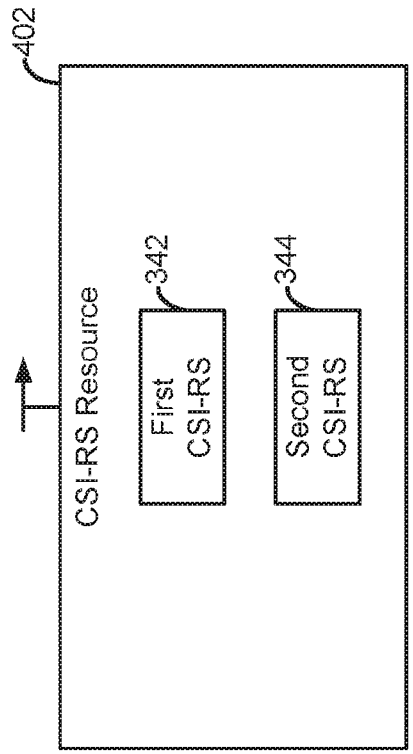
FIG. 4 is a block diagram of an example of a joint transmission that may be sent using TRPs of a wireless communication system according to some aspects of the present disclosure.

FIG. 4 illustrates a first example of the joint transmission 340. In the example of FIG. 4, the first CSI-RS 342 sent by the first TRP 322 is multiplexed within a same CSI-RS resource 402 as the second CSI-RS 344 sent by the second TRP 324. In some implementations, the CSI-RS 342, 344 are multiplexed within the same CSI-RS resource 402 when a number of ports associated with the CSI-RS 342, 344 is relatively small (e.g., is less than a threshold number of ports).

Figure 5:
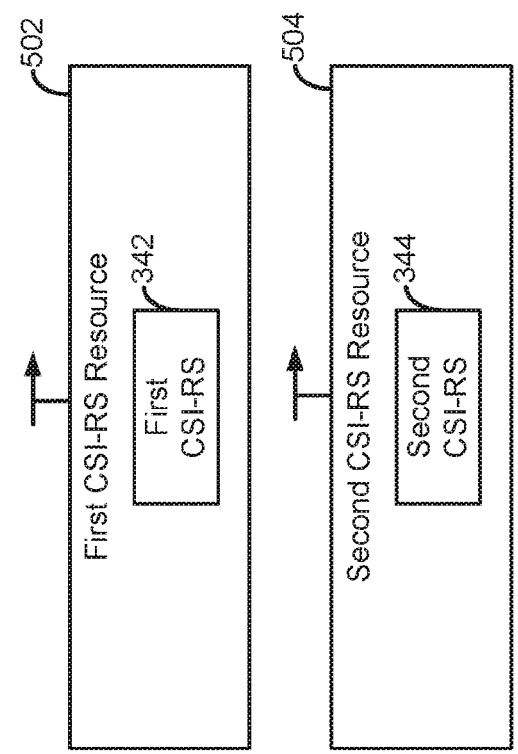
FIG. 5 is a block diagram of another example of a joint transmission that may be sent using TRPs of a wireless communication system according to some aspects of the present disclosure.

FIG. 5 illustrates a second example of the joint transmission 340. In the example of FIG. 5, the first CSI-RS 342 is sent within a first CSI-RS resource 502 and the second CSI-RS 344 is sent within a second CSI-RS resource 504 that is different than the first CSI-RS resource 502. In some implementations, the CSI-RS 342, 344 are sent using the separate CSI-RS resources 502, 504 when a number of ports associated with the CSI-RS 342, 344 is relatively large (e.g., is greater than or equal to a threshold number of ports).

Thus, in some examples, the implementation of FIG. 4 or FIG. 5 can be selected based on particular characteristics of a communication system. For example, the implementation of FIG. 4 or FIG. 5 can be selected based on a number of ports associated with the CSI-RS 342, 344.

Figure 6:
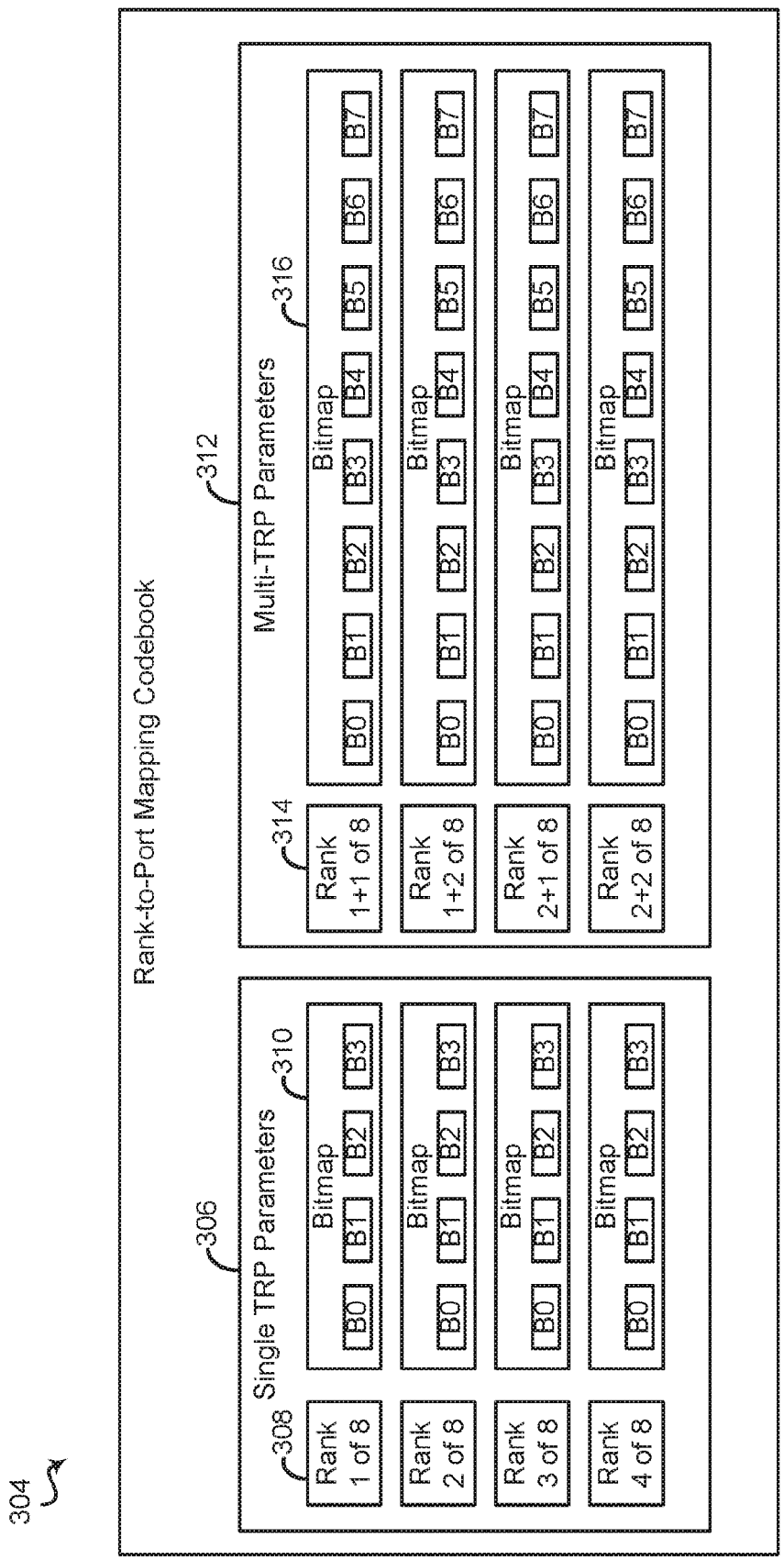
FIG. 6 is an example of a rank-to-port mapping codebook and that may be transmitted and used within a wireless communication system according to some aspects of the present disclosure.

FIG. 6 illustrates a particular example of the rank-to-port mapping codebook 304. In some examples, the rank-to-port mapping codebook 304 of FIG. 6 is utilized in connection with the implementation described with reference to FIG. 4 (e.g., where multiple CSI-RS are multiplexed within a common CSI-RS resource).

In FIG. 6, the single TRP parameters 306 include a plurality of rank parameters each associated with a corresponding port index parameter. In the example of FIG. 6, each port index parameter includes a port selection bit mapping of bits B0, B1, B2, and B3. Each bit may correspond to a respective port of a TRP. To illustrate, in one example, the bits B0, B1, B2, and B3 may correspond to the ports P0, P1, P2, and P3, respectively, or to the ports P4, P5, P6, and P7, respectively. A particular value of a bit may indicate whether the port is selected. For example, a value of "0" of the bit B0 may indicate that a particular port (e.g., the port P0 or the port P5) is not selected, and a value of "1" of the bit B0 may indicate that the particular port is selected.

In the single TRP parameters 306, a rank of 1 may indicate that a single spatial stream is received from a single TRP (e.g., the first TRP 322 or the second TRP 324), and the corresponding port selection bit mapping may indicate selection of a first set of one or more ports of the single TRP (e.g., one or more of the ports P0, P1, P2, and P3, or one or more of the ports P4, P5, P6, and P7). As additional examples, a rank of 2, 3, or 4 may indicate that two, three, or fourth spatial streams are received from a single TRP, and the corresponding port selection bit mapping may indicate selection of a second, third, or fourth set of one or more ports of the single TRP, respectively.

The multi-TRP parameters 312 include a plurality of joint rank parameters each associated with a corresponding port index parameter. In the example of FIG. 6, each port index parameter includes a port selection bit mapping of bits B0, B1, B2, B3, B4, B5, B6, and B7. Each bit may correspond to a respective port of a TRP. To illustrate, in one example, the bits B0, B1, B2, and B3 may correspond to the ports P0, P1, P2, and P3, respectively, and the bits B4, B5, B6, and B7 correspond to the ports P4, P5, P6, and P7, respectively. A particular value of a bit may indicate whether the port is selected. For example, a value of "0" of the bit B0 may indicate that a particular port (e.g., the port P0) is not selected, and a value of "1" of the bit B0 may indicate that the particular port is selected.

In the multi-TRP parameters 312, a rank of 1+1 may indicate that a single spatial stream is received from one TRP (e.g., the first TRP 322) and that a single spatial stream is received from another TRP (e.g., the second TRP 324), and the corresponding port selection bit mapping may indicate selection of a first set of one or more ports of the TRPs (e.g., one or more of the ports P0, P1, P2, P3, P4, P5, P6, and P7). As another example, a rank of 1+2 may indicate that a single spatial stream is received from one TRP (e.g., the first TRP 322) and that two spatial streams are received from another TRP (e.g., the second TRP 324), and the corresponding port selection bit mapping may indicate selection of a second set of one or more ports of the TRPs (e.g., one or more of the ports P0, P1, P2, P3, P4, P5, P6, and P7). As an additional example, a rank of 2+1 may indicate that two spatial streams are received from one TRP (e.g., the first TRP 322) and that one spatial stream is received from another TRP (e.g., the second TRP 324), and the corresponding port selection bit mapping may indicate selection of a third set of one or more ports of the TRPs (e.g., one or more of the ports P0, P1, P2, P3, P4, P5, P6, and P7). As a further example, a rank of 2+2 may indicate that two spatial streams are received from one TRP (e.g., the first TRP 322) and that two spatial streams are received from another TRP (e.g., the second TRP 324), and the corresponding port selection bit mapping may indicate selection of a fourth set of one or more ports of the TRPs (e.g., one or more of the ports P0, P1, P2, P3, P4, P5, P6, and P7).

Thus, in FIG. 6, each joint rank parameter may be based on a first number (e.g., 1 or 2) of spatial streams received from the first TRP 322 and a second number (e.g., 1 or 2) of spatial streams received from the second TRP 324. Further, in FIG. 6, the rank-to-port mapping codebook 304 indicates, for multiple combinations of values of the first number and the second number, a corresponding port selection bit mapping of the port index parameter. For example, in FIG. 6, the multiple combinations include 1+1, 1+2, 2+1, and 2+2. To further illustrate, Table 1 depicts an example of the rank-to-port mapping codebook 304 of FIG. 6:

TABLE 1

| Rank 1 of 8 | PortIndex8 |
|---|---|
| Rank 2 of 8 | SEQUENCE(SIZE(2)) OF PortIndex8 |
| Rank 3 of 8 | SEQUENCE(SIZE(3)) OF PortIndex8 |
| Rank 4 of 8 | SEQUENCE(SIZE(4)) OF PortIndex8 |
| Rank 1 + 1 of 8 | SEQUENCE(SIZE(2)) OF PortIndex8 |
| Rank 1 + 2 of 8 | SEQUENCE(SIZE(3)) OF PortIndex8 |
| Rank 2 + 1 of 8 | SEQUENCE(SIZE(3)) OF PortIndex8 |
| Rank 2 + 2 of 8 | SEQUENCE(SIZE(4)) OF PortIndex8 |

In Table 1, entries of the left column may correspond to the rank parameters of FIG. 6. For example, "Rank 1 of 8" may correspond to the rank parameter 308, and "Rank 1+1 of 8" may correspond to the joint rank parameter 314. Entries of the right column of Table 1 may correspond to the port index parameters of FIG. 6. For example, "PortIndex8" may correspond to the port index parameter 310, and "SEQUENCE(SIZE(2)) OF PortIndex8" may correspond to the port index parameter 316.

It is noted that certain examples described with reference to FIG. 6 are provided for illustration and are not limiting. For example, FIG. 6 is described with reference to an eight-port configuration. In other examples, other configurations are within the scope of the disclosure (e.g., four ports, sixteen ports, or another number of ports).

Figure 7:
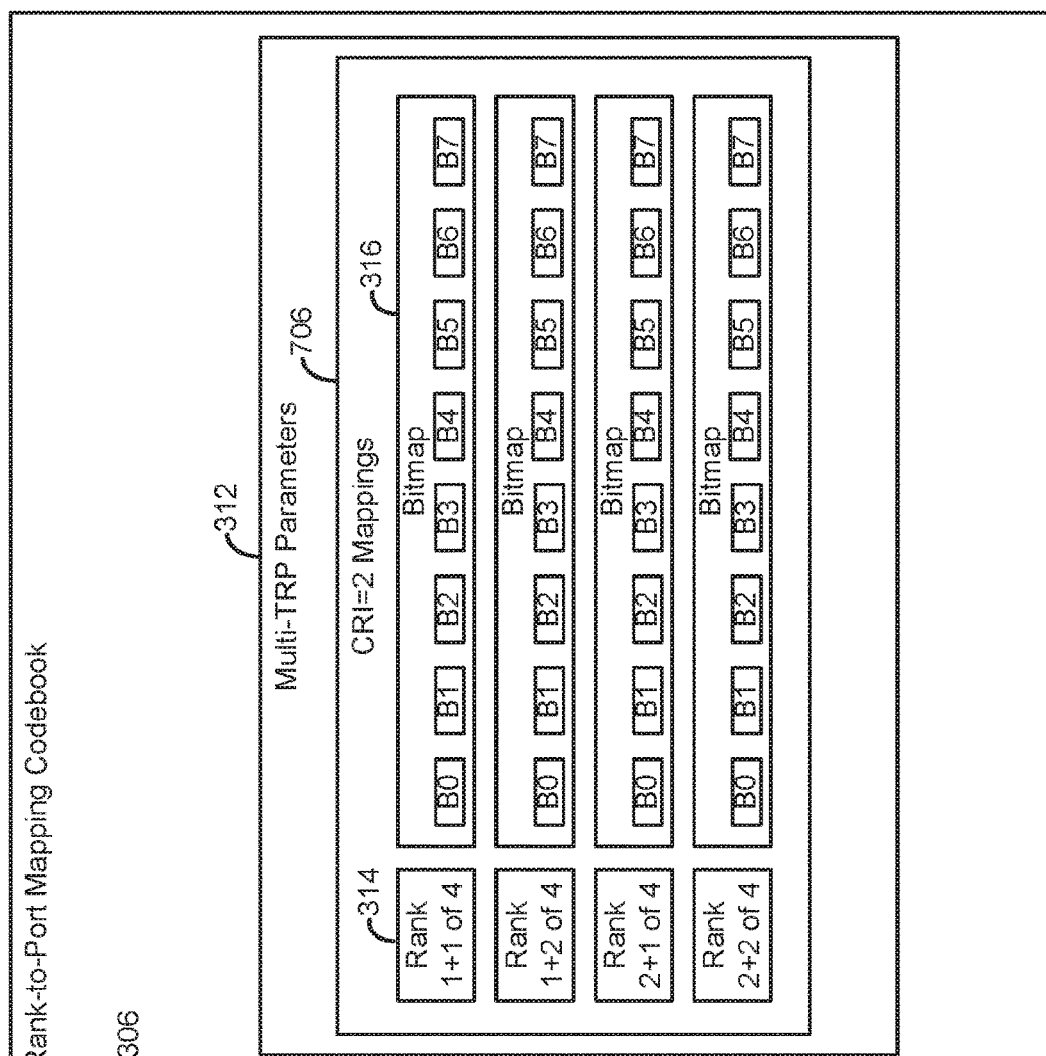
FIG. 7 is another example of the rank-to-port mapping codebook and that may be transmitted and used within a wireless communication system according to some aspects of the present disclosure.
Figure 7:
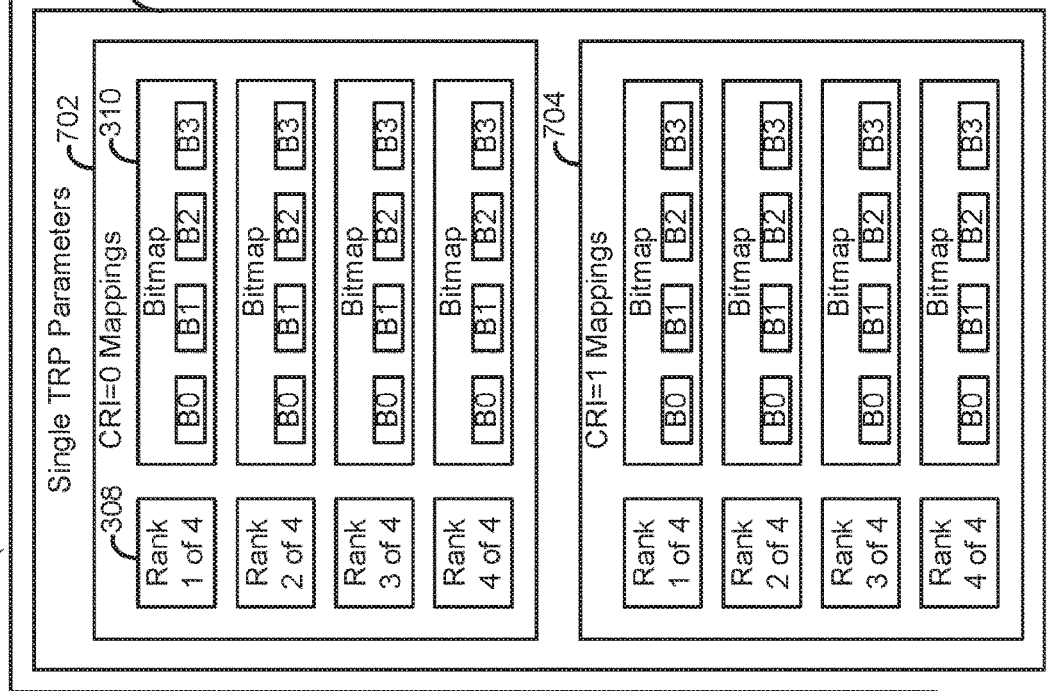

FIG. 7 illustrates another example of the rank-to-port mapping codebook 304. In some examples, the rank-to-port mapping codebook 304 of FIG. 7 is utilized in connection with the implementation described with reference to FIG. 7 (e.g., where multiple CSI-RS are transmitted using multiple corresponding CSI-RS resources).

In FIG. 7, the rank-to-port mapping codebook 304 includes, for each of a plurality of values of the CRI 354, multiple rank-to-port mappings. For example, in FIG. 6, the plurality of values of the CRI 354 include 0, 1, and 2. The multiple rank-to-port mappings may include rank-to-port mappings 702 (corresponding to a value of 0 of the CRI 354), rank-to-port mappings 704 (corresponding to a value of 1 of the CRI 354), and rank-to-port mappings 706 (corresponding to a value of 2 of the CRI 354).

Further, in FIG. 6, the rank-to-port mappings 706 include a plurality of rank pairs for a particular value (e.g., 2) of the plurality of values of the CRI 354. For example, for the value of 2 of the CRI 354, the plurality of rank pairs include a rank of 1+1, a rank of 1+2, a rank of 2+1, and a rank of 2+2. To further illustrate, Example 1 depicts pseudo-code of a lookup table that may correspond to the example of the rank-to-port mapping codebook 304 of FIG. 7:

Example 1

```
CRI=0
{
    portIndex4              SEQUENCE{
        rank1-4         PortIndex4
        rank2-4         SEQUENCE(SIZE(2))
        rank3-4         SEQUENCE(SIZE(3))
        rank4-4         SEQUENCE(SIZE(4)) OF PortIndex4
}
CRI=1
{
    portIndex4              SEQUENCE{
        rank1-4         PortIndex4
        rank2-4         SEQUENCE(SIZE(2)) OF PortIndex4
        rank3-4         SEQUENCE(SIZE(3)) OF PortIndex4
        rank4-4         SEQUENCE(SIZE(4)) OF PortIndex4
}
CRI=2
{
    portIndex4              SEQUENCE{
        rank1+1-4       SEQUENCE(SIZE(3)) PortIndex4
        rank1+2-4       SEQUENCE(SIZE(3)) OF PortIndex4
        rank2+1-4       SEQUENCE(SIZE(3)) OF PortIndex4
        rank2+2-4       SEQUENCE(SIZE(4)) OF PortIndex4
    }
}
```

In Example 1, parameters of "CRI=0" may correspond to the rank-to-port mappings 702 of FIG. 7. Further, parameters of "CRI=1" and "CRI=2" may correspond to the rank-to-port mappings 704 and the rank-to-port mappings 706, respectively.

In some examples, inclusion of the multiple rank-to-port mappings 702, 704, and 706 may enable the UE 115 to "down-select" from a multi-TRP mode of operation (e.g., where the UE 115 communicates with both the first TRP 322 and the second TRP 324) to a single-TRP mode of operation (e.g., where the UE 115 communicates with one of the first TRP 322 or the second TRP 324). As an example, the UE 115 may initiate down-selection in response to detecting that an energy difference between signals from one TRP and signals from another TRP satisfies a threshold energy difference. In this example, the UE 115 may initiate the down-selection to avoid interference from signals of one TRP to signals of another TRP that may occur in some cases.

Figure 8:
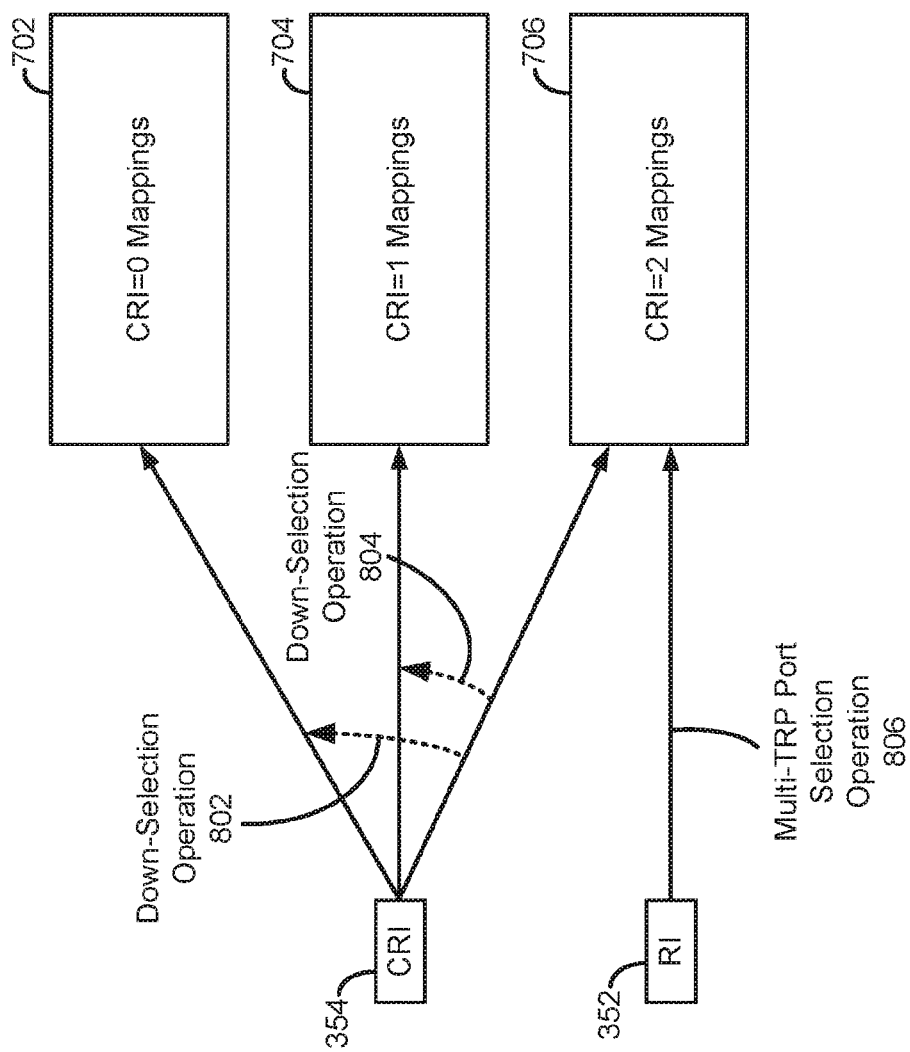
FIG. 8 is a diagram illustrated certain examples of operations that may be performed within a wireless communication system according to some aspects of the present disclosure.

To illustrate, referring to FIG. 8, the UE 115 may set a value of the CRI 354 to 2 to select the multi-TRP mode of operation (e.g., to communicate with both of the TRPs 322, 324). The UE 115 may select ports (or indicate a preferred selection of ports) of the TRPs 322, 324 using the RI 352 and the CRI 354 (e.g., by indicating the RI 352 and the CRI 354 to the base station 105 using the CSI report message 350). For example, the UE 115 may provide the RI 352 to the TRPs 322, 324 using the CSI report message 350, and the base station 105 may perform a lookup operation based on the RI 352 (e.g., to identify ports indicated by the port index parameter 316). Providing the RI 352 and the CRI 354 to the base station 105 to indicate selection of ports of the TRPs 322, 324 may be referred to as a multi-TRP port selection operation 806.

To down-select from the multi-TRP mode of operation to the single-TRP mode of operation, the UE 115 may set a value of the CRI 354 to 0 or 1 to select the single-TRP mode of operation (e.g., to communicate with one, but not both, of the TRPs 322, 324). For example, the UE 115 may send a message (e.g., the CSI report message 350) indicating a value of 0 of the CRI 354 to initiate down-selection from the multi-TRP transmission mode to the single-TRP transmission mode. Setting the value of 0 of the CRI 354 may cause the base station 105 to communicate with the UE 115 using one (but not both) of the TRPs 322, 324. Modifying the value of the CRI 354 from 2 to 0 may be referred to as a down-selection operation 802.

As another example, the UE 115 may send a message (e.g., the CSI report message 350) indicating a value of 1 of the CRI 354 to initiate down-selection from the multi-TRP transmission mode to the single-TRP transmission mode. Setting the value of 1 of the CRI 354 may cause the base station 105 to communicate with the UE 115 using one (but not both) of the TRPs 322, 324. Modifying the value of the CRI 354 from 2 to 1 may be referred to as a down-selection operation 804.

Thus, down-selecting from the multi-TRP transmission mode to the single-TRP transmission mode includes setting a particular value of the CRI 354 (e.g., by adjusting the value from 2 to 1 or to 0). As a result, the UE 115 may efficiently change operation from the multi-TRP transmission mode to the single-TRP transmission mode.

Figures 9, 10:
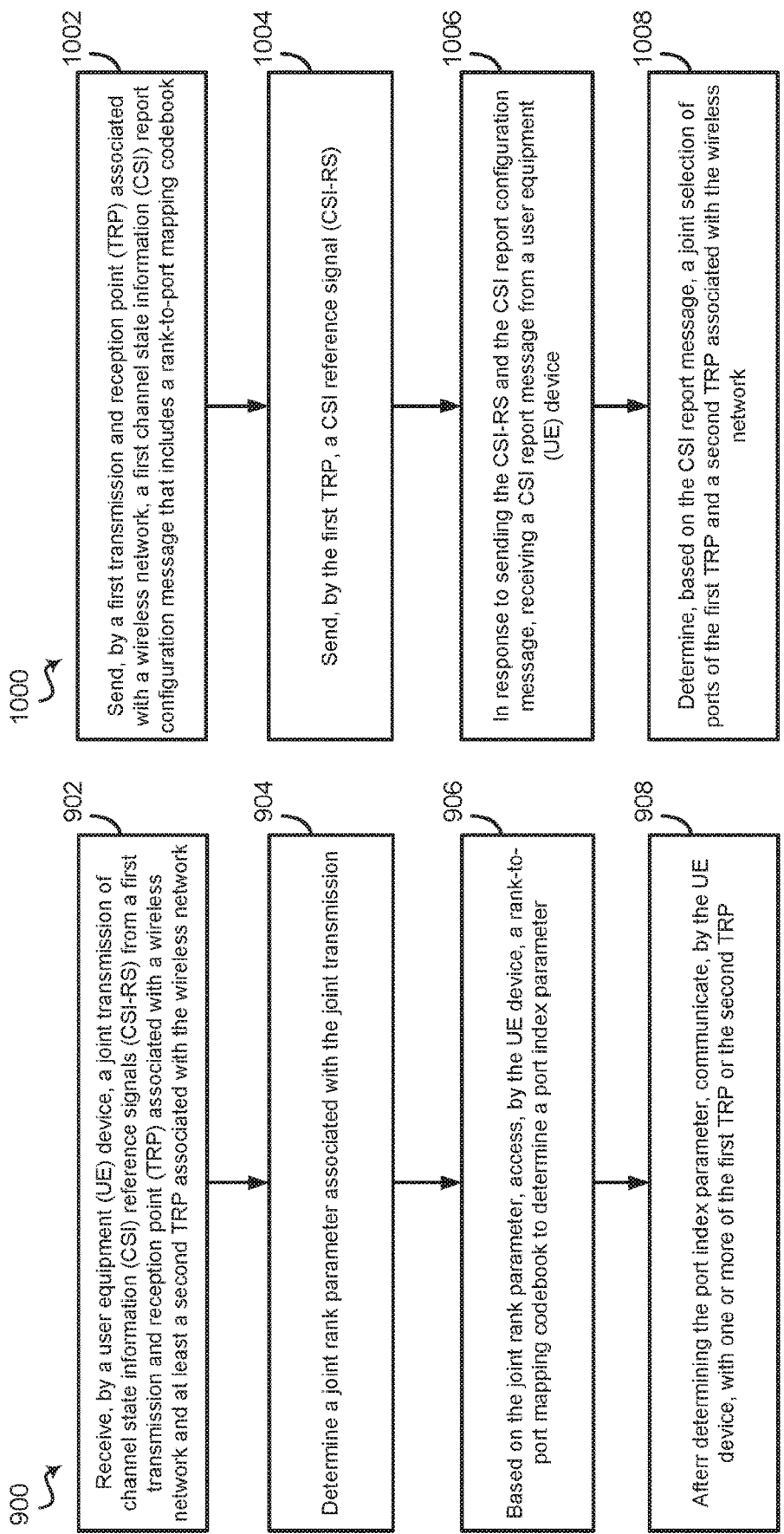
FIG. 9 is a flow chart of a method of wireless communication that may be performed by a user equipment (UE) device of a wireless communication system according to some aspects of the present disclosure.
FIG. 10 is a flow chart of a method of wireless communication that may be performed by a base station of a wireless communication system according to some aspects of the present disclosure.
Figure 11:
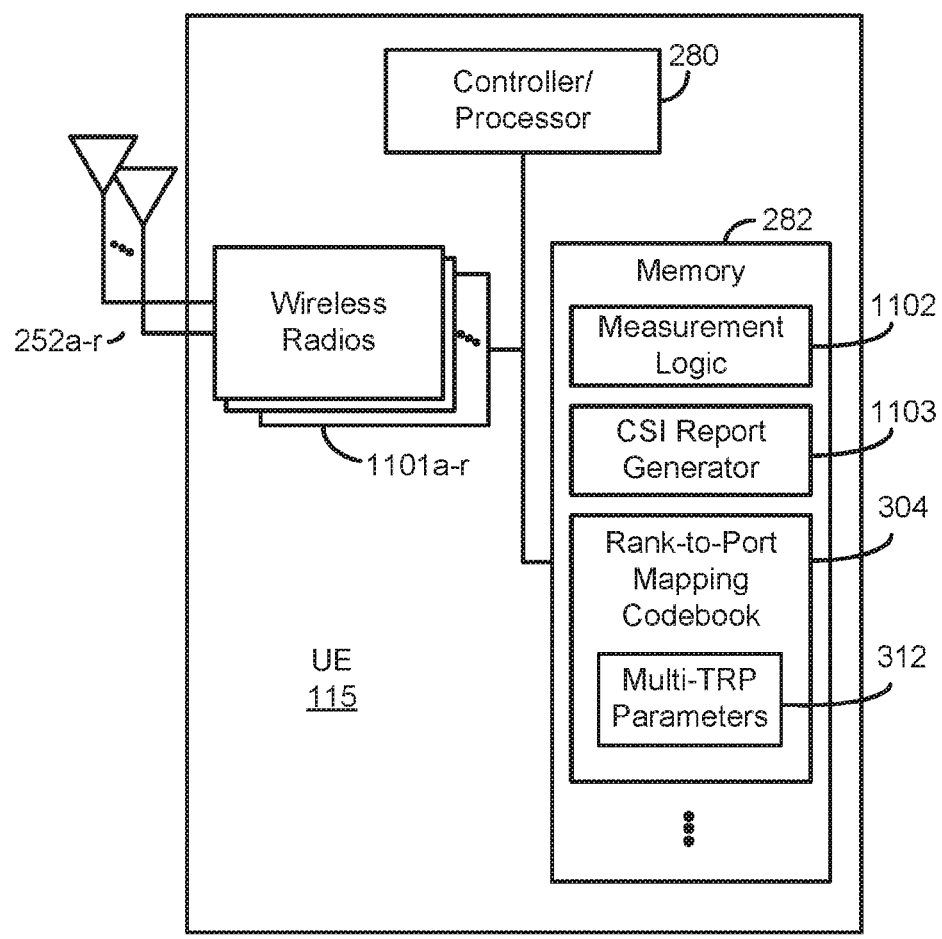
FIG. 11 is a block diagram conceptually illustrating a design of a UE configured to perform port selection with multiple TRPs according to some aspects of the present disclosure.

FIG. 9 is a block diagram illustrating example blocks executable by a UE device (e.g., the UE 115) to implement one aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101a-r and antennas 252a-r. Wireless radios 1101a-r includes various components and hardware, as illustrated in FIG. 2 for UE 115, including modulator/demodulators 254a-r, MIMO detector 256, receive processor 258, transmit processor 264, and TX MIMO processor 266.

Memory 282 is configured to store instructions, data, or other information that enables joint port selection for multiple TRPs. For example, memory 282 may store measurement logic 1102 executable by controller/processor 280 to perform one or more network measurements, such as a measurement to generate information include the CSI report message 350. As a particular example, the measurement logic 1102 may be executable by controller/processor 280 to determine the joint rank parameter 314. FIG. 11 also illustrates that memory 282 is configured to store a CSI report generator 1103. CSI report generator 1103 may be executable by controller/processor 280 to generate the CSI report message 350. FIG. 11 further depicts that memory 282 stores the rank-to-port mapping codebook 304.

Referring to FIG. 9, a sample flow diagram of a method 900 of operation of a UE for wireless communication is shown. As illustrated at block 902, method 900 includes receiving, by a UE device, a joint transmission of CSI-RS from a first TRP associated with a wireless network and at least a second TRP associated with the wireless network. For example, the UE 115 may receive the joint transmission 340 of the first CSI-RS 342 and the second CSI-RS 344 from the first TRP 322 and the second TRP 324.

At block 904, method 900 further includes determining a joint rank parameter associated with the joint transmission. For example, UE 115 may determine any joint rank parameter of the rank-to-port mapping codebook 304, such as the joint rank parameter 314.

At block 906, method 900 further includes accessing, based on the joint rank parameter and by the UE device, a rank-to-port mapping codebook to determine a port index parameter. For example, UE 115 may perform a lookup operation to the rank-to-port mapping codebook 304 based on the joint rank parameter 314 to identify the port index parameter 316.

At block 908, after determining the port index parameter, method 900 further includes communicating, by the UE device, with one or more of the first TRP or the second TRP. As a particular example, UE 115 may send the CSI report message 350 indicating the RI 352 and the CRI 354.

In a first aspect, the communicating includes sending, by the UE device, a CSI report message including a rank indicator (RI) corresponding to the joint rank parameter.

In a second aspect, the port index parameter includes a port selection bit mapping indicating a selection of ports of the first TRP and the second TRP, and the port selection bit mapping includes, for each value of a plurality of values of the joint rank parameter, a plurality of bits each having a value indicating whether a corresponding port is selected.

In a third aspect, the joint rank parameter is based on a first number of spatial streams received from the first TRP and a second number spatial streams received from the second TRP.

In a fourth aspect, the rank-to-port mapping codebook indicates, for multiple combinations of values of the first number and the second number, a corresponding bit mapping of the port index parameter.

In a fifth aspect, a first CSI-RS sent by the first TRP is multiplexed within a same CSI-RS resource as a second CSI-RS sent by the second TRP.

In a sixth aspect, a first CSI-RS sent by the first TRP is transmitted using a first CSI-RS resource, and a second CSI-RS sent by the second TRP is transmitted using a second CSI-RS resource different than the first CSI-RS resource.

In a seventh aspect, the rank-to-port mapping codebook includes, for each of a plurality of values of a CSI-RS resource indicator (CRI), multiple rank-to-port mappings, and the multiple rank-to-port mappings include a plurality of rank pairs for a particular value of the plurality of values of the CRI.

In an eighth aspect, the method 900 further includes down-selecting from a multi-TRP transmission mode of operation to a single-TRP transmission mode of operation.

In a ninth aspect, down-selecting from the multi-TRP transmission mode to the single-TRP transmission mode includes setting a particular value of a CSI-RS resource indicator (CRI).

Figure 12:
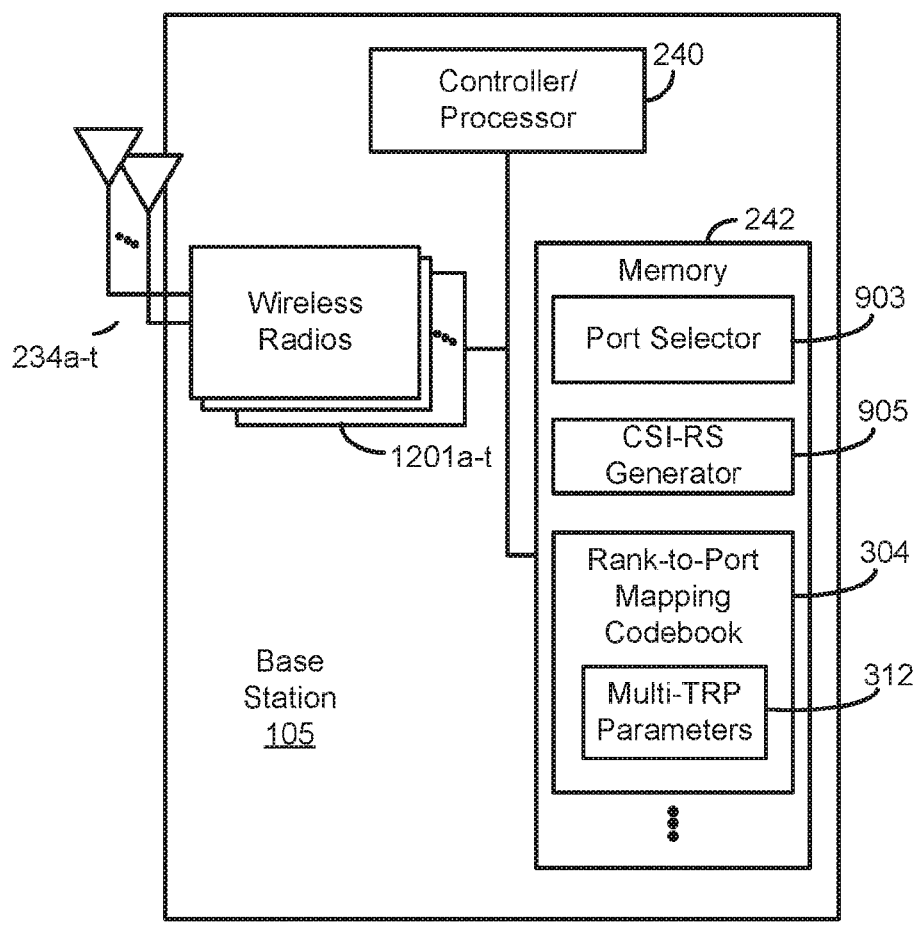
FIG. 12 is a block diagram conceptually illustrating a design of a base station configured to perform port selection with multiple TRPs according to some aspects of the present disclosure.

FIG. 10 is a block diagram illustrating example blocks executed to implement one aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1201a-t and antennas 234a-t. Wireless radios 1201a-t includes various components and hardware, as illustrated in FIG. 2 for base station 105, including modulator/demodulators 232a-t, MIMO detector 236, receive processor 238, transmit processor 220, and TX MIMO processor 230.

Memory 242 is configured to store instructions, data, or other information that enables joint port selection for multiple TRPs. For example, memory 242 may store a port selector 903 executable by controller/processor 240 to select one or more of the ports P0-P7 of the TRPs 322, 324 for a joint transmission, such as a NCJT. FIG. 12 also illustrates that memory 282 is configured to store a CSI-RS generator 905. CSI-RS generator 905 may be executable by controller/processor 240 to generate the first CSI-RS 342, the second CSI-RS 344, or both. FIG. 11 further depicts that memory 282 stores the rank-to-port mapping codebook 304.

Referring to FIG. 10, a sample flow diagram of a method 1000 of operation of a base station for wireless communication is shown. As illustrated at block 1002, method 1000 includes sending, by a first TRP associated with a wireless network, a CSI report configuration message that includes a rank-to-port mapping codebook. For example, the first TRP 322 may send the CSI report configuration message 330 including the rank-to-port mapping codebook 304.

At block 1004, method 1000 further includes sending, by the first TRP, a first CSI-RS. For example, the first TRP 322 may send the first CSI-RS 342.

At block 1006, method 1000 further includes receiving, in response to sending the CSI-RS and the CSI report configuration message, a CSI report message from a UE device. For example, the base station 105 may receive the CSI report message 350 from the UE 115.

At block 1008, method 1000 further includes determining, based on the CSI report message, a joint selection of ports of the first TRP and a second TRP associated with the wireless network. For example, the controller 302 may perform a lookup operation to the rank-to-port mapping codebook 304 to determine a selection of the ports P0-P7. As a particular illustrative example, the CSI report message 350 may indicate the RI 352, and the controller 302 may perform the lookup operation to determine the port index parameter 316 based on the RI 352. The port index parameter 316 may indicate the a selection of the ports P0-P7.

In a tenth aspect, the joint selection of ports indicates ports across a single CSI-RS resource for a non-coherent joint transmission (NCJT) between the first TRP and the second TRP.

In an eleventh aspect, the joint selection of ports indicates ports across multiple CSI-RS resources for a non-coherent joint transmission (NCJT) between the first TRP and the second TRP.

In a twelfth aspect, determining the joint selection of ports includes accessing a port selection bit mapping of the rank-to-port mapping codebook.

In a thirteenth aspect, the CSI report message includes a rank indicator (RI), and the port selection bit mapping is accessed based on the RI.

In a fourteenth aspect, the rank-to-port mapping codebook includes, for each value of a plurality of values of a joint rank parameter, a plurality of bits each having a value indicating whether a corresponding port is selected.

In a fifteenth aspect, the joint rank parameter is based on a first number of spatial streams received from the first TRP and a second number spatial streams received from the second TRP.

In a sixteenth aspect, the rank-to-port mapping codebook indicates, for multiple combinations of values of the first number and the second number, a corresponding bit mapping of a port index parameter.

In a seventeenth aspect, the rank-to-port mapping codebook includes, for each of a plurality of values of a CSI-RS resource indicator (CRI), multiple rank-to-port mappings, and the multiple rank-to-port mappings include a plurality of rank pairs for a particular value of the plurality of values of the CRI.

In an eighteenth aspect, the method 1000 further includes receiving, from the UE device, a message initiating down-selection from a multi-TRP transmission mode of operation to a single-TRP transmission mode of operation.

In a nineteenth aspect, the message includes a CSI-RS resource indicator (CRI) initiating the down-selection from the multi-TRP transmission mode to the single-TRP transmission mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, certain features discussed herein be implemented via specialized processor circuitry, via executable instructions, and/or combinations thereof. For example, a lookup operation to access the rank-to-port mapping codebook 304 may be performed via specialized circuitry, via executable instructions, or a combination thereof.

Those of skill would further appreciate that the various illustrative logical blocks, modules, circuits, and algorithm steps (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
  receiving, by a user equipment (UE) device, a joint transmission of channel state information (CSI) reference signals (CSI-RS) from a first transmission and reception point (TRP) associated with a wireless network and at least a second TRP associated with the wireless network;
  determining a joint rank parameter associated with the joint transmission;
  based on the joint rank parameter, accessing, by the UE device, a rank-to-port mapping codebook to determine a port index parameter; and
  after determining the port index parameter, communicating, by the UE device, with one or more of the first TRP or the second TRP.

2. The method of claim 1, wherein a first CSI-RS sent by the first TRP is transmitted using a first CSI-RS resource, and wherein a second CSI-RS sent by the second TRP is transmitted using a second CSI-RS resource different than the first CSI-RS resource.

3. The method of claim 2, wherein the rank-to-port mapping codebook includes, for each of a plurality of values of a CSI-RS resource indicator (CRI), multiple rank-to-port mappings, and wherein the multiple rank-to-port mappings include a plurality of rank pairs for a particular value of the plurality of values of the CRI.

4. The method of claim 1, wherein the rank-to-port mapping codebook includes, for each of a plurality of values of a CSI-RS resource indicator (CRI), multiple rank-to-port mappings.

5. The method of claim 1, wherein the rank-to-port mapping codebook indicates a plurality of values of a CSI-RS resource indicator (CRI) and further indicates a plurality of rank pairs for a particular value of the plurality of values of the CRI.

6. The method of claim 1, further comprising receiving a CSI report configuration message that includes the rank-to-port mapping codebook.

7. The method of claim 1, further comprising transmitting a CSI report message in accordance with the joint transmission, wherein the communicating is performed in accordance with a joint selection of ports of the first TRP and the second TRP, the joint selection of ports being in accordance with the CSI report message.

8. A method of wireless communication, comprising:
sending, by a first transmission and reception point (TRP) associated with a wireless network, a first channel state information (CSI) report configuration message that includes a rank-to-port mapping codebook;
sending, by the first TRP, a CSI reference signal (CSI-RS);
in response to sending the CSI-RS and the CSI report configuration message, receiving a CSI report message from a user equipment (UE) device; and
determining, based on the CSI report message, a joint selection of ports of the first TRP and a second TRP associated with the wireless network.

9. The method of claim 8, wherein the joint selection of ports indicates ports across a single CSI-RS resource for a non-coherent joint transmission (NCJT) between the first TRP and the second TRP.

10. The method of claim 8, wherein the joint selection of ports indicates ports across multiple CSI-RS resources for a non-coherent joint transmission (NCJT) between the first TRP and the second TRP.

11. The method of claim 8, wherein determining the joint selection of ports includes accessing a port selection bit mapping of the rank-to-port mapping codebook.

12. The method of claim 11, wherein the CSI report message includes a rank indicator (RI), and wherein the port selection bit mapping is accessed based on the RI.

13. The method of claim 8, wherein the rank-to-port mapping codebook includes, for each value of a plurality of values of a joint rank parameter, a plurality of bits each having a value indicating whether a corresponding port is selected.

14. The method of claim 13, wherein the joint rank parameter is based on a first number of spatial streams received from the first TRP and a second number spatial streams received from the second TRP.

15. The method of claim 14, wherein the rank-to-port mapping codebook indicates, for multiple combinations of values of the first number and the second number, a corresponding bit mapping of a port index parameter.

16. The method of claim 8, wherein the rank-to-port mapping codebook includes, for each of a plurality of values of a CSI-RS resource indicator (CRI), multiple rank-to-port mappings, and wherein the multiple rank-to-port mappings include a plurality of rank pairs for a particular value of the plurality of values of the CRI.

17. An apparatus configured for wireless communication, the apparatus comprising:
at least one processor; and
a memory coupled to the at least one processor,
wherein the at least one processor is configured to:
receive, by a user equipment (UE) device, a joint transmission of channel state information (CSI) reference signals (CSI-RS) from a first transmission and reception point (TRP) associated with a wireless network and at least a second TRP associated with the wireless network;
determine a joint rank parameter associated with the joint transmission;
based on the joint rank parameter, access, by the UE device, a rank-to-port mapping codebook to determine a port index parameter; and
after determining the port index parameter, communicate, by the UE device, with one or more of the first TRP or the second TRP.

18. The apparatus of claim 17, wherein the at least one processor is further configured to initiate sending, by the UE device, a CSI report message including a rank indicator (RI) corresponding to the joint rank parameter.

19. The apparatus of claim 17, wherein the port index parameter includes a port selection bit mapping indicating a selection of ports of the first TRP and the second TRP, and wherein the port selection bit mapping includes, for each value of a plurality of values of the joint rank parameter, a plurality of bits each having a value indicating whether a corresponding port is selected.

20. The apparatus of claim 17, wherein the joint rank parameter is based on a first number of spatial streams received from the first TRP and a second number spatial streams received from the second TRP.

21. The apparatus of claim 20, wherein the rank-to-port mapping codebook indicates, for multiple combinations of values of the first number and the second number, a corresponding bit mapping of the port index parameter.

22. An apparatus configured for wireless communication, the apparatus comprising:
at least one processor; and
a memory coupled to the at least one processor,
wherein the at least one processor is configured to:
send, by a first transmission and reception point (TRP) associated with a wireless network, a first channel state information (CSI) report configuration message that includes a rank-to-port mapping codebook;
send, by the first TRP, a CSI reference signal (CSI-RS);
in response to sending the CSI-RS and the CSI report configuration message, receive a CSI report message from a user equipment (UE) device; and
determine, based on the CSI report message, a joint selection of ports of the first TRP and a second TRP associated with the wireless network.

23. The apparatus of claim 22, wherein the joint selection of ports indicates ports across a single CSI-RS resource for a non-coherent joint transmission (NCJT) between the first TRP and the second TRP.

24. The apparatus of claim 22, wherein the joint selection of ports indicates ports across multiple CSI-RS resources for a non-coherent joint transmission (NCJT) between the first TRP and the second TRP.

25. The apparatus of claim 22, wherein the at least one processor is further configured to determine the joint selection of ports by accessing a port selection bit mapping of the rank-to-port mapping codebook.

26. The apparatus of claim 25, wherein the CSI report message includes a rank indicator (RI), and wherein the port selection bit mapping is accessed based on the RI.

27. The apparatus of claim 22, wherein the rank-to-port mapping codebook includes, for each value of a plurality of values of a joint rank parameter, a plurality of bits each having a value indicating whether a corresponding port is selected.

28. The apparatus of claim 27, wherein the joint rank parameter is based on a first number of spatial streams received from the first TRP and a second number spatial streams received from the second TRP.

29. The apparatus of claim 28, wherein the rank-to-port mapping codebook indicates, for multiple combinations of values of the first number and the second number, a corresponding bit mapping of a port index parameter.

30. The apparatus of claim 22, wherein the rank-to-port mapping codebook includes, for each of a plurality of values of a CSI-RS resource indicator (CRI), multiple rank-to-port mappings, and wherein the multiple rank-to-port mappings include a plurality of rank pairs for a particular value of the plurality of values of the CRI.

* * * * *